(12) United States Patent
McDonald, Jr. et al.

(10) Patent No.: US 7,233,834 B2
(45) Date of Patent: Jun. 19, 2007

(54) COMPUTER-AIDED MODELING AND MANUFACTURE OF PRODUCTS

(75) Inventors: John T. McDonald, Jr., Memphis, TN (US); Sean A. Smith, Memphis, TN (US); Norman J. Weeks, III, Memphis, TN (US); Kevin R. Anderson, Cedar Rapids, IA (US)

(73) Assignee: Cargill, Inc., Minneapolis, MN (US)

( * ) Notice: Subject to any disclaimer, the term of this patent is extended or adjusted under 35 U.S.C. 154(b) by 111 days.

(21) Appl. No.: 10/884,622

(22) Filed: Jul. 2, 2004

(65) Prior Publication Data

US 2005/0038538 A1 Feb. 17, 2005

Related U.S. Application Data

(60) Provisional application No. 60/494,936, filed on Aug. 13, 2003.

(51) Int. Cl.
*G06F 19/00* (2006.01)
(52) U.S. Cl. .................................. 700/108; 702/183
(58) Field of Classification Search ............. 700/108, 700/90, 1, 28; 702/183, 184
See application file for complete search history.

(56) References Cited

U.S. PATENT DOCUMENTS 5,680,320 A 10/1997 Helmer et al.
6,038,540 A 3/2000 Krist et al.
6,549,864 B1 4/2003 Potyrailo
2003/0144746 A1 7/2003 Hsiung et al.
2003/0154044 A1* 8/2003 Lundstedt et al. .......... 702/104
2004/0225377 A1* 11/2004 Kokotov et al. ............... 700/1

OTHER PUBLICATIONS

International Search Report for International Application No. PCT/US04/21422, filed Jul. 2, 2004, 3 pgs.
Written Opinion of the International Search Report Authority for International Application No. PCT/US04/21422, filed Jul. 2, 2004, 3 pgs.
International Preliminary Report on Patentability for International Application No. PCT/US2004/021422, filed Jul. 2, 2004, 3 pgs.
International Preliminary Examination Report for PCT Application No. PCT/US2004/021422, mailed Jun. 13, 2005. 4 pages.

* cited by examiner

*Primary Examiner*—Zoila Cabrera
(74) *Attorney, Agent, or Firm*—Shumaker & Sieffert, P.A.

(57) ABSTRACT

Disclosed are modeling and process control techniques for manufacturing products. More specifically, computer-aided modeling techniques are described that allow the manufacturer to predict a profile for a multivariate output that is necessary to achieve a target performance property for a manufactured product.

31 Claims, 10 Drawing Sheets

COMPUTER-AIDED MODELING AND MANUFACTURE OF PRODUCTS

The application claims priority from U.S. application Ser. No. 60/494,936, filed Aug. 13, 2003, the entire content of which is incorporated herein by reference.

TECHNICAL FIELD

The invention relates to computer-aided techniques for manufacturing products.

BACKGROUND

In an industrial manufacturing environment, accurate control of the manufacturing process is important. Ineffective process control can lead to manufacture of products that fail to meet desired yield and quality levels. Furthermore, poor process control can significantly increase costs due to increased raw material usage, labor costs and the like. Accordingly, many manufactures seek to develop computational models or simulations for the manufacturing process. Other manufacturers rely heavily on operator experience to control the process.

SUMMARY

In general, the invention is directed to modeling and process control techniques for manufacturing products, such as monomers, ionomers, oligomers, polymers, inorganic particles, and network polymers including polysaccharides. A network polymer is a set of homo- or hetero-polymers in which three-dimensional molecular linkages are formed through hydrogen bonding, covalent bonding, or ionic bonding. When using these types of polymers, the performance properties of the manufactured product are highly dependent on the functionality of the monomer units and the three dimensional network polymer structure, and may vary greatly with the degree of ionic or covalent cross-linking of the polymer. The extent of cross-linking throughout a polymer network is a function of a number of different variables in the manufacturing process including cure time and temperature during the cure cycle. In other words, a network polymer may be "functionalized" by finely controlling the process variables during manufacturing.

The invention makes use of the relationship between product performance and operating parameters to control the performance properties of the manufactured product. More specifically, computer-aided modeling techniques are described for correlating performance properties of a manufactured product with operating parameters of the manufacturing process. In particular, a "forward" modeling technique is described that allows a manufacturer to predict performance variables of a manufactured product from multivariate output data, such as particle size distribution (PSD), rheology profiles, texture profiles, gas chromatography outputs, liquid chromatography outputs, thermal analysis outputs, infrared spectroscopy outputs, Raman spectroscopy outputs, and optical absorption spectroscopy outputs data. In addition, a "reverse" modeling technique is described that allows the manufacturer to predict a profile for a multivariate output that is necessary to achieve target performance properties for the product. In other words, the reverse model allows the manufacturer to precisely control the manufacturing process in order to produce products having desired performance properties. These techniques allow the manufacturer to selectively produce products having specified performance capabilities based on pricing, recent sales volumes, geographic locations of manufacturing facilities, customer preference information, current inventory, or other strategic business information. The manufacturer may produce products within various ranges of performance, for example, thereby lending to a tiered pricing scheme. In particular, the techniques can be applied to finely control the manufacturing of any product, for example monomers, ionomers, oligomers, polymers, inorganic particles, and network polymers including polysaccharides that may have application in food products, and industrial products such as coatings and paint, rubber products, resins, polyesters, adhesives, and the like.

As described in detail below, the modeling techniques make use of chemometric algorithms, and apply the chemometric algorithms to measured physical properties such as the particle size distribution. The modeling techniques described herein are illustrated in reference to a manufactured paper product. In particular, a starch may be used during the manufacturing process as an additive to build densification and impart certain strength enhancements to the paper. As an example, the modeling and process control techniques are utilized in correlating performance variables of the paper to a particle size distribution (PSD) of the additive. The performance variables for the paper product may include, for example, surface strength, internal bond, burst strength, tensile strength, tear strength, porosity, short span compression (SCT), dynamic contact angle, and starch retention.

In one embodiment, the invention is directed to a method comprising selecting a value for a performance variable of a product, and calculating a multivariate output based on the selected value. The method further includes selecting an operating parameter based on the calculated multivariate output, and manufacturing a product according to the selected operating parameter for example, reaction time, a reaction temperature, an addition rate for the reactants, a concentration of the reactants, and mixing intensity of the reaction. Calculating a multivariate output may include, for example, calculating a particle size distribution (PSD) for an additive. Other measured multivariate outputs include, for example, rheology profiles, texture profiles, gas chromatography outputs, liquid chromatography outputs, thermal analysis outputs, infrared spectroscopy outputs, Raman spectroscopy outputs, and optical absorption spectroscopy outputs.

In another embodiment, the invention is directed to a system comprising a server that stores a chemometric model that correlates a performance variable of a product with a multivariate output within the product, and a software module that executes on the server to present an interface to receive a selection of the performance variable. The server may comprise a web server and the interface may comprise a user interface, for example. As another example, the software module may comprise an application programming interface (API) to programmatically receive the selection. The system may further comprise a client computer located within a manufacturing facility and coupled to the server via a network, wherein the server communicates a process parameter to the client computer based on the selection.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
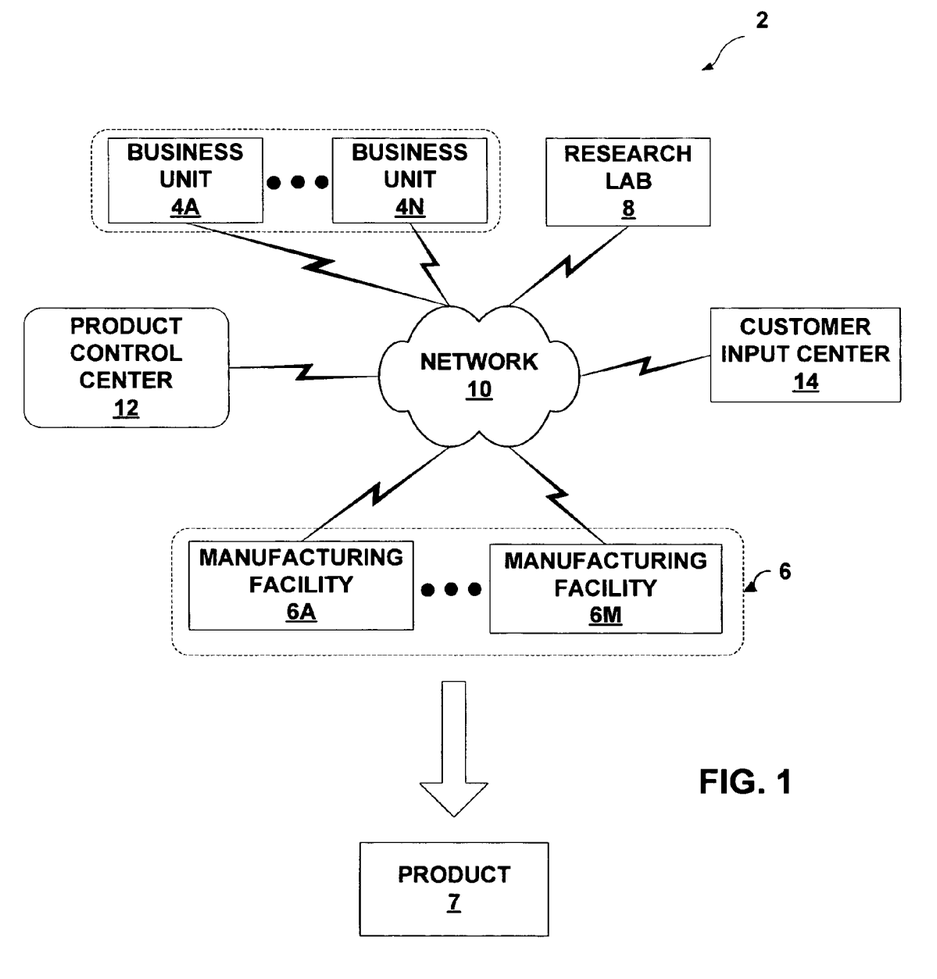
FIG. 1 is a block diagram illustrating a system for controlling and modeling the manufacture of products.

FIG. 1 is a block diagram illustrating a system 2 for modeling and controlling the manufacture of a product 7. More specifically, product control center 12 maintains an chemometric data model that correlates performance properties of manufactured product 7 with a multivariate output, such as a particle size distribution. Product 7 may be any product, for example, monomers, ionomers, oligomers, polymers, inorganic particles, and network polymers including polysaccharides that may have application in food products, and industrial products such as coatings and paint, rubber products, resins, polyesters, adhesives, and the like.

Remote manufacturing facilities 6 communicate with a product control center 12 via network 10 to retrieve specific operating parameters based on desired performance parameters of manufactured product 7. Remote manufacturing facilities 6 finely control the manufacturing process according to the retrieved parameters in order to produce product 7 according to the desired performance properties.

Research lab 8 interacts with product control center 12 and manufacturing facilities 6 to develop and update the chemometric models. Initially, research lab 8 develops the model by analyzing samples of product 7 produced by manufacturing facilities 6. In general, research lab may measure one or more performance properties for product 7, as well as one or more multivariate output used to manufacture product 7. Based on these measurements, research lab 8 develops correlations between the measured multivariate output and the performance properties of product 7. Notably, research lab 8 applies chemometric algorithms to the measured data in order to develop the model. Research lab 8 may, for example, apply chemometric algorithms to correlate performance properties of product 7 to particle size distribution (PSD) data. Other measured multivariate output includes, for example, rheology profiles, texture profiles, gas chromatography outputs, liquid chromatography outputs, thermal analysis outputs, infrared spectroscopy outputs, Raman spectroscopy outputs, and optical absorption spectroscopy. Once research lab 8 has developed the model, research lab 8 communicates the model to product control center 12. Business units 4 communicate with product control center 12 to select desired performance properties for product 7 produced by manufacturing facilities 6. In particular, the chemometric modeling techniques employed by product control center 12 allows business units 4 to specifically control the performance properties of product 7 produced by manufacturing facilities 6. Accordingly, business units 4 may control the manufacturing process to produce desired products.

Business units 4 may, for example, direct manufacturing facilities 6 to produce products having different performance properties based on pricing, customer preference information received from customer input center 14, current inventory, current sales volumes, geographic preferences or other strategic business information. Business units 4 may, for example, interact with product control center 12 to direct manufacturing facilities 6 to produce products within various ranges of performance, thereby lending to a tiered pricing scheme. In addition, product control center 12 supports and facilitates "on-demand" manufacturing of product 7 having precise performance property. By streamlining the delivery of process control data to such manufacturing facilities 6 when needed, business units 4 can direct manufacturing facilities 6 to manufacture products when inventory levels dictate, thereby allowing the company to satisfy any "just-in-time" manufacturing and supply contracts and other business relationships the company may service.

In general, authorized users of business units 4, research lab 8 and customer input center 14 interact with product control center 12 via network 10 to develop and update the model, as well as to provide strategic business information to control the manufacture of product 7. Each user typically interacts with a computing device suitable for communication and interaction with product control center 12 via network 10. For example, a user may use a workstation, personal computer, laptop computer, or even a personal digital assistant (PDA) such as a Palm™ organizer from Palm Inc. of Santa Clara, Calif. or Windows CE device. The communication device executes communication software, typically a web browser such as Internet Explorer™ from Microsoft Corporation of Redmond, Wash., in order to communicate with product control center 12. Network 10 represents any communication link suitable for communicating data, such as a wide-area network, local area network, or a global computer network like the World Wide Web.

The features of system 2 are described herein with reference to a manufactured paper product that includes a starch additive. The starch may be used during manufacturing to build densification, as well as strength enhancements such as surface strength, internal bond, burst strength, tensile strength, tear strength, porosity, short span compression (SCT), dynamic contact angle, and starch retention for product 7. For illustration purposes only, the techniques are described so as to illustrate development of forward and reverse chemometric models that correlate particle size distribution (PSD) data with performance characteristic of a paper product. Nevertheless, the techniques described herein are not limited to paper products and particle size distributions.

Figure 2:
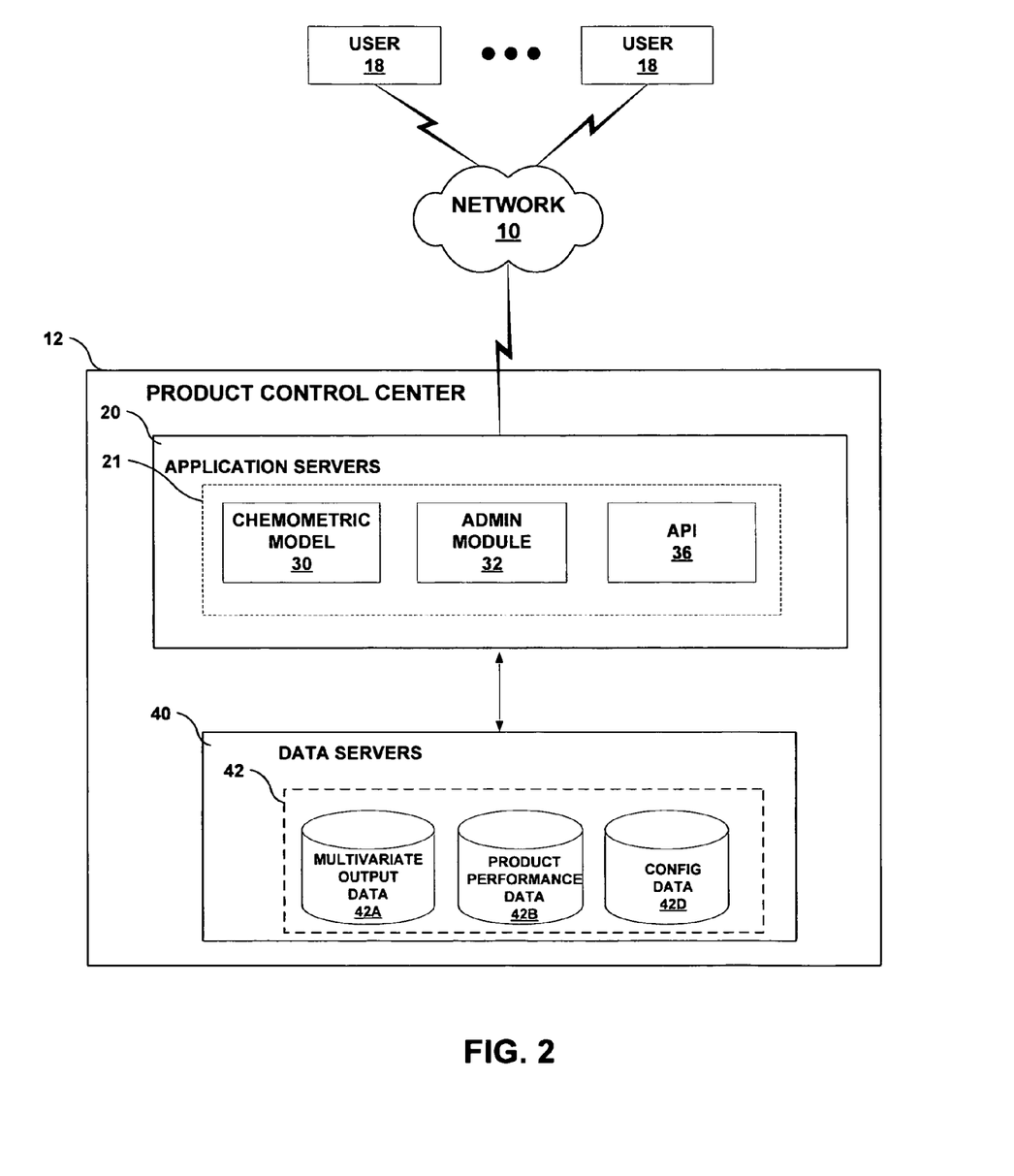
FIG. 2 is a block diagram illustrating an example product control center.

FIG. 2 is a block diagram illustrating an example product control center 12 in further detail. Application servers 20 provide an interface by which users 18 communicate with product control center 12 via network 10. In one configuration, application servers 20 execute web server software, such as Internet Information Server™ from Microsoft Corporation, of Redmond, Wash. As such, application servers 20 provide an environment for interacting with users 18 according to software modules 21, which can include Active Server Pages, web pages written in hypertext markup language (HTML) or dynamic HTML, Active X modules, Lotus scripts, Java scripts, Java Applets, Distributed Component Object Modules (DCOM), software modules written in Visual Basic, software programs for executing within a mathematical environment such as MatLab™ from MathWorks™, and the like.

Although illustrated as "server side" software modules executing within an operating environment provided by application servers 20, software modules 21 could readily be implemented as "client-side" software modules executing on computing devices used by users 18. Software modules 21 could, for example, be implemented as ActiveX modules executed by a web browser executing on the computing devices.

Software modules 21 each include chemometric model 30 that acts as a modeling engine for correlating a multivariate output within a product to performance properties of the product. Software modules 21 may include a number of additional modules including administration (Admin) module 32, and application programming interface (API) 36. Software modules 21 interact with data servers 40 to access a number of data stores 42, including multivariate output data 42A, product performance data 42B, and configuration (config) data 42C. Multivariate output data 42A may comprise, for example, particle size distribution (PSD). Each data store 42 may be implemented in a number of different forms including a data storage file, or one or more database management systems (DBMS) executing on one or more database servers. The database management systems may be a relational (RDBMS), hierarchical (HDBMS), multidimensional (MDBMS), object oriented (ODBMS or OODBMS) or object relational (ORDBMS) database management system. Furthermore, although illustrated separately, data stores 42 could be combined into a single database or other data storage structure. Data stores 42 could, for example, be implemented as a single relational database such as SQL Server from Microsoft Corporation.

Administration (admin) module 32 presents an interface by which authorized users, such as system administrators, configure product control center 12. A system administrator may, for example, manage accounts for users 18, including setting access privileges, and define a number of corporate and user preferences. Admin module 32 allows the system administrator to define access rights for users 18 to control the access to the various software modules 21. In this manner, not all users can access all of the software modules 21.

Application programming interface (API) 36 provides the ability to establish direct connections with external computing devices, allowing such devices to automatically interact with product control center 12. A front-end module, such as a script or command line interface provided by the remote computing device, for example, may communicate with API 36 directly, bypassing the interfaces presented by other software modules 21. In this manner, a front-end module within a remote manufacturing facility 6 can automatically interact with product control center 12, and engage chemometric model 30 to generate data for controlling a manufacturing process data. As a result, API 36 may be used at manufacturing time to automatically provide run-time information for manufacture of a product.

Figure 3:
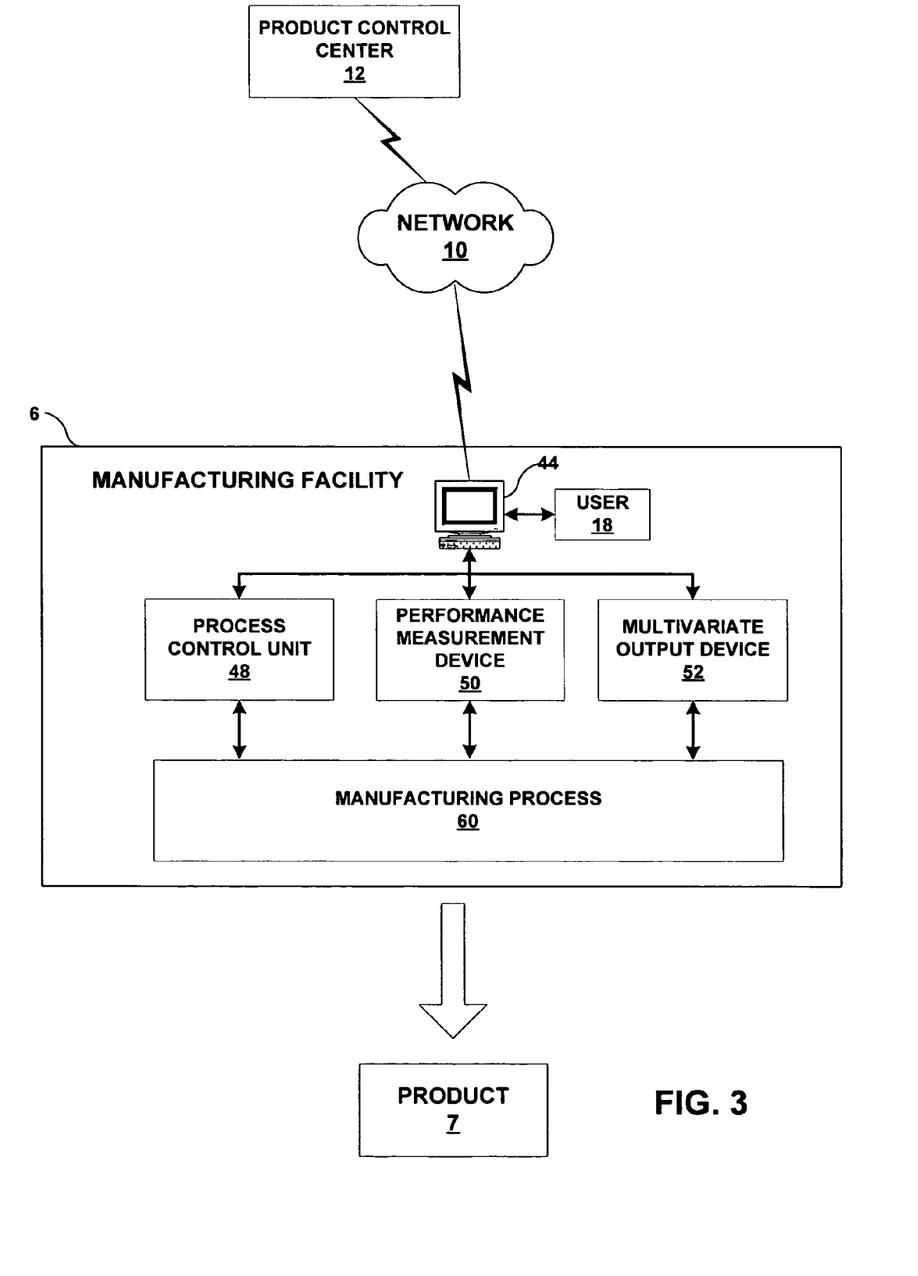
FIG. 3 is a block diagram illustrating an example manufacturing facility.

FIG. 3 is a block diagram illustrating an example manufacturing facility 6 in further detail. A remote user, such as a plant engineer, interacts with workstation 44 that is communicatively coupled to product control center 12 via network 10. Specifically, workstation 44 may execute client software, such as a web browser or similar communication software, to engage chemometric model 30 of product control center 12. Via workstation 44, user 18 may direct chemometric model 30 to calculate a multivariate output that is necessary to produce product 7 having a desired performance property. User 18 may provide the performance information to product control center 12 directly. Alternatively, business units 4 may provide the desired performance criteria based on business information.

Based on the calculated values for the multivariate output, chemometric model 30 determines process control information, such as a reaction time, a reaction temperature, an addition rate for the reactants, a concentration of the reactants, and mixing intensity of the reaction, and the like. Product control center 12 communicates the operating parameters to manufacturing facility 6 via network 10. Workstation 44 receives the operating parameters and directs process control unit 48 to control manufacturing process 60 accordingly.

Manufacturing facility may also include performance measurement device 50 for providing real-time monitoring of one or more performance properties of product 7 produced by manufacturing process 60. In addition, manufacturing facility 6 may include a multivariate output device 52 for providing real-time monitoring of the manufactured product 7. In one embodiment, for example, multivariate output device 52 may comprise a Malvern Fraunhofer particle size analyzer for measuring the particle size distribution (PSD) within product 7.

Figure 4:
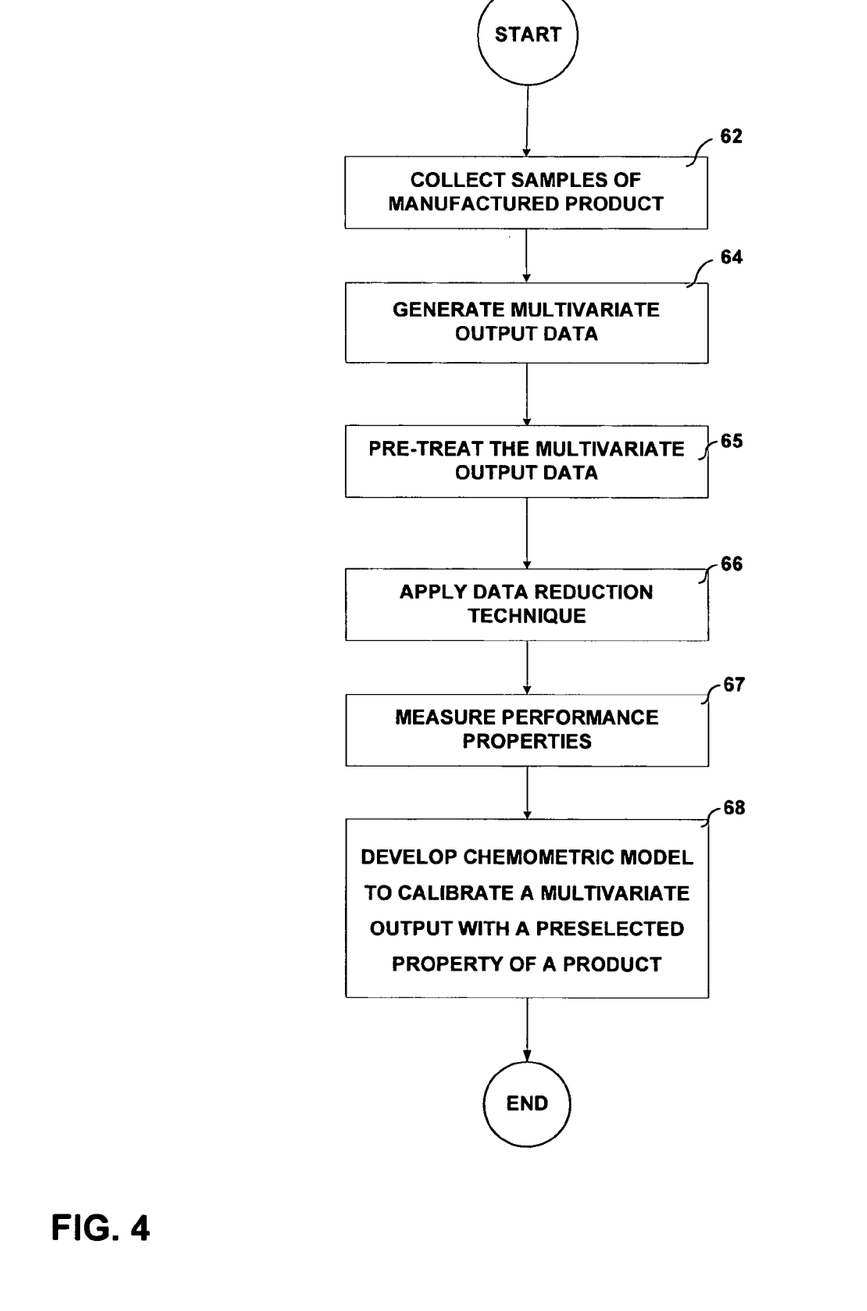
FIG. 4 is a flowchart illustrating development of a first "forward" chemometric model from which performance properties of a manufactured product can be predicted based on a multivariate output.

FIG. 4 is a flowchart illustrating research lab 8 developing a chemometric model (also referred to herein as the "first" forward model) from which performance properties of manufactured product 7 can be predicted from multivariate output data, such as particle size distribution (PSD) data. In particular, the first regression model can be used to calibrate a multivariate output with a preselected property of product 7. In one embodiment, for example, research lab 8 uses chemometric algorithms to correlate dynamic light scattering PSD data to performance properties for samples of manufactured product 7.

Initially, research lab 8 collects samples of a manufactured product from one or more manufacturing facilities 6 (62). In particular, the samples are produced according to varying operating parameters in order to ensure a variety of performance properties. Next, research lab 8 generates multivariate output data indicative of a physical property (64). Research lab 8 may, for example, generate PSD data from the samples using dynamic light scattering techniques.

Upon gathering this data, research lab 8 pre-treats the multivariate output, e.g., the PSD data, to ensure the data is uniform (65). Research lab 8 may, for example, process the multivariate output data to ensure that substantially all of the data conforms to a set of minimum and maximum limits. Research lab 8 may use a variety of techniques, including applying a moving average smoothing function, a Savitsky-Golay smoothing function, a mean normalization smoothing function, maximum and range normalization functions, first and second derivative functions, baseline correction, standard normal variant transformations, and the like.

Next, research lab 8 applies a data reduction technique to allow for easier processing of the multivariate output data (66). Research lab 8 may, for example, apply a Fourier deconvolution in which a Fourier transform is used to describe a profile of the multivariate output data. Alternatively, research lab 8 may generate a raw correlation plot between the multivariate output data and the performance properties of product 7 in order to identify and select a set of key ranges of the multivariate output that have the highest ability to influence the performance property.

Research lab 8 then measures one or more performance properties for the product (67). For example, with respect to a paper product, research lab 8 may measure surface strength, internal bond, burst strength, tensile strength, tear strength, porosity, short span compression (SCT), dynamic contact angle, and starch retention of the paper product. Finally, research lab 8 develops the first forward chemometric model from which performance properties can be predicted from multivariate output data, such as particle size distribution (PSD) data (68). A variety of techniques may be used to develop this chemometric model, including Multiple Linear Regression, Partial Least Squares, Principle Component Regression, Artificial Neural Networks including Back-Propagation Networks, General Regression Networks, group method of data handling networks, and other calibration-based chemometric modeling techniques. Other methods include Discriminate Analysis, Kohonen Neural Networks, Probability Neural Networks, Classification and Regression Trees, and Bayesian Networks.

Figure 5:
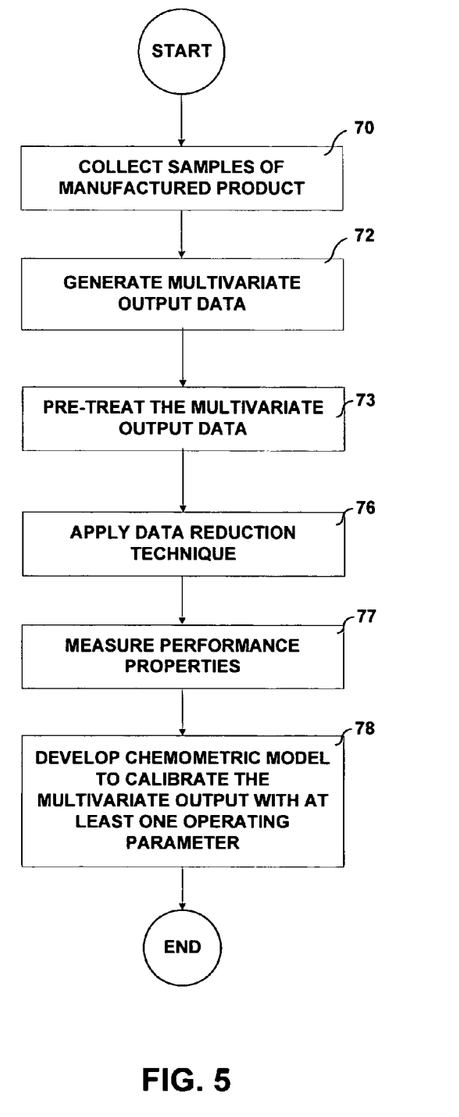
FIG. 5 is a flowchart illustrating the development of a "second" forward chemometric model to calibrate the multivariate output with at least one operating parameter.

FIG. 5 is a flowchart illustrating the development of a forward chemometric model to predict operating parameters (also referred to herein as the "second" forward model). In particular, the second forward model may be used to calibrate the multivariate output with at least one operating parameter that affects the value of the preselected property.

Initially, research lab 8 collects samples of a manufactured product from one or more manufacturing facilities 6 (70), while recording the operating parameters used in the process to generate those samples. In particular, the samples are produced according to varying operating parameters in order to ensure a variety of performance properties. Next, research lab 8 generates multivariate output data indicative of a physical property (72). Research lab 8 may, for example, generate PSD data from the samples using dynamic light scattering techniques.

Upon gathering this data, research lab 8 pre-treats the multivariate output, e.g., the PSD data, to ensure the data is uniform (73). Research lab 8 may, for example, process the multivariate output data to ensure that substantially all of the data conforms to a set of minimum and maximum limits. Research lab 8 may use a variety of techniques, including applying a moving average smoothing function, a Savitsky-Golay smoothing function, a mean normalization smoothing function, maximum and range normalization functions, first and second derivative functions, baseline correction, standard normal variant transformations, and the like.

Next, research lab 8 applies a data reduction technique to allow for easier processing of the multivariate output data (76). Research lab 8 may, for example, apply a Fourier deconvolution in which a Fourier transform is used to describe a profile of the multivariate output data. Alternatively, research lab 8 may generate a raw correlation plot between the multivariate output data and the performance properties of product 7 in order to identify and select a set of key ranges of the multivariate output that have the highest ability to influence the performance property.

Research lab 8 then measures one or more performance properties for the product (77). For example, with respect to a paper product, research lab 8 may measure surface strength, internal bond, burst strength, tensile strength, tear strength, porosity, short span compression (SCT), dynamic contact angle, and starch retention of the paper product. Finally, research lab 8 develops the second forward chemometric model the multivariate output data, such as particle size distribution (PSD) data, can be calibrated with at least one operating parameter (78).

A variety of techniques may be used to develop this chemometric model, including Multiple Linear Regression, Partial Least Squares, Principle Component Regression, Artificial Neural Networks including Back-Propagation Networks, General Regression Networks, group method of data handling networks, and other calibration-based chemometric modeling techniques. Other methods include Discriminate Analysis, Kohonen Neural Networks, Probability Neural Networks, Classification and Regression Trees, and Bayesian Networks.

By making use of the first and second forwarding models, product control center 12 (FIG. 1) can use the multivariate output data, such as a PSD profile, to predict the performance properties of a particular batch or "run" of product 7. However, in order to allow business units 4 and manufacturing facilities 6 to selectively produce product 7 having desired performance properties, research lab 8 can further develop a reverse model. In other words, with a reverse model, the multivariate output of the product process can be controlled in order to produce desired performance properties in a manufactured product. In particular, the reverse chemometric model allows product control center 12 to predict a profile for a multivariate output that is necessary to produce product 7 having desired performance properties. In other words, the reverse model employed by product control center 12 allows business units 4 to specifically control the performance properties of the products produced by manufacturing facilities 6. In this manner, business units 4 may direct manufacturing facilities 6 to produce products having different performance properties based on pricing, customer preference information received from customer input center 14, current inventory, or other similar business information. Business units 4 may, for example, interact with product control center 12 to direct manufacturing facilities 6 to produce products within various ranges of performance, thereby lending to a tiered pricing scheme.

Figure 6:
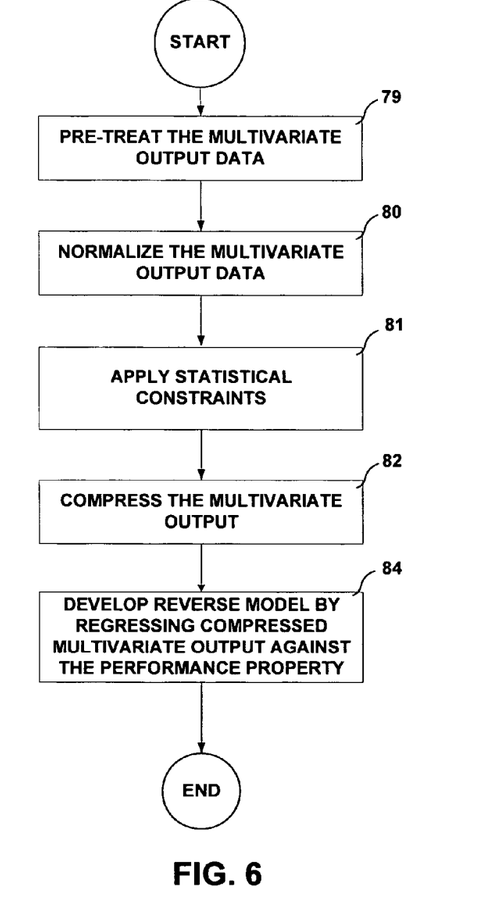
FIG. 6 is a flowchart illustrating the development of a "reverse" chemometric model from which a multivariate output can be predicted based on desired performance properties of a manufactured product.

FIG. 6 is a flowchart further illustrating development of a reverse chemometric model from which a version of the multivariate output, such as a PSD profile, can be predicted based on desired performance properties of a manufactured product. To develop the reverse model, research lab 8 may use the same type of data used for developing the first forward model. In particular, research lab may make use of the multivariate output data as well as the performance property data collected from samples of product 7 that have a range of performance properties. Initially, research lab 8 pre-treats the multivariate output data, e.g., the PSD data, to ensure the data is uniform (79). Research lab 8 may, for example, smooth the multivariate output data by applying a three-point moving average. In addition, research lab 8 may apply maximum normalization to the multivariate output data to compensate for sensitivity of the measuring instrument (80). The relative intensity of Fraunhofer-generated PSD data, for example, may be highly sensitive to the number of particles passing through the measurement path of the instrument. PSD data, for example, may be normalized on a scale from zero to one, where a value zero represents the size interval having the fewest number of particles present, and a value of one represents the size interval having the most particles present. Normalization may be necessary because reverse modeling methods may be much more accurate in determining the shape of the PSD curve than the absolute number of particles in the distribution. In other words, the distribution of particle sizes, for example, may be more important than the actual values of particle sizes in determining performance or product 7.

After this treatment, research lab 8 applies statistical constraints to the multivariate output (81). Such constraints may include subtracting the average multivariate output profile of the data set used to build the two forward models from each of the multivariate output profiles that will be used to construct the reverse model. The constraints may also include dividing each of these multivariate outputs by the standard deviation of the set of aforementioned multivariate output profiles. The constraints may also include subtracting the contribution of a given multivariate output profile's contribution to the forward model used to predict operating parameters from that multivariate output profile. This may be done by first multiplying the multivariate output by the regression vector determined from the forward model of the operating parameters, and then subtracting the multiple of the regression vector thus determined from the given multivariate output. Each of the above statistical constraints is designed to remove any variation in the multivariate output profile that cannot be predicted by the product performance properties. Each of these calculations is stored for later use, since they constitute a template for re-constructing the (de-compressed) multivariate output.

Next, research lab 8 compresses the multivariate output data by, for example, representing the multivariate output data as a polynomial (82). Research lab 8 may, for example, describe PSD curves for the samples using complex polynomials having a number of coefficients. Curves for PSD data, for example, may contain hundreds of data points but often may be represented with less than a dozen coefficients.

Once data compression is accomplished, research lab 8 develops the reverse model by, for example, regressing the polynomial coefficients against the results of the performance tests, i.e., the measured data for the performance properties of product 7 (84). Note that this type of regression is unusual in that the reverse model has reversed the usual relationship of independent and dependent variables. Here, the multivariate output data is serving as the dependent or predicted variable, while the performance property for product 7 is serving as the independent or prediction variable. Because of this relationship, and because the physical property data to be predicted may have a complex shape, a simple linear relationship may not be adequate to predict the shape of the PSD curve, for example, from only a few input variables.

One chemometric regression method that research lab 8 may use, for example, is the Partial Least Squares regression algorithm in which a polynomial relationship is used to form a regression between the performance property of product 7 and PSD data. Specifically, research lab 8 may make use of an iterative approach to determine what degree of polynomial best expresses the PSD curves as well as what degree of polynomial best expresses the regression between the coefficients of the polynomial and the performance properties. The iteration may result in, for example, a combination of PSD and regression polynomials that result in the lowest residuals between the predicted multivariate output and the actual multivariate output measured from the samples. These iterations may be aided by setting an upper limit for the degree of polynomial that can be used to express the regression relationship in order to avoid an "over fit."

Other multivariate chemometric analysis methods may be used for forming non-linear relationships between the performance data of product 7 and the multivariate output data used during manufacturing. As described above, such techniques may include Multiple Linear Regression, Partial Least Squares, Principle Component Regression, Artificial Neural Networks including Back-propagation networks, general regression networks, group method of data handling networks, and other calibration-based chemometric modeling techniques. Other methods include Discriminate Analysis, Kohonen Neural Networks, Probability Neural Networks, Classification and Regression Trees, and Bayesian Networks.

Figure 7:
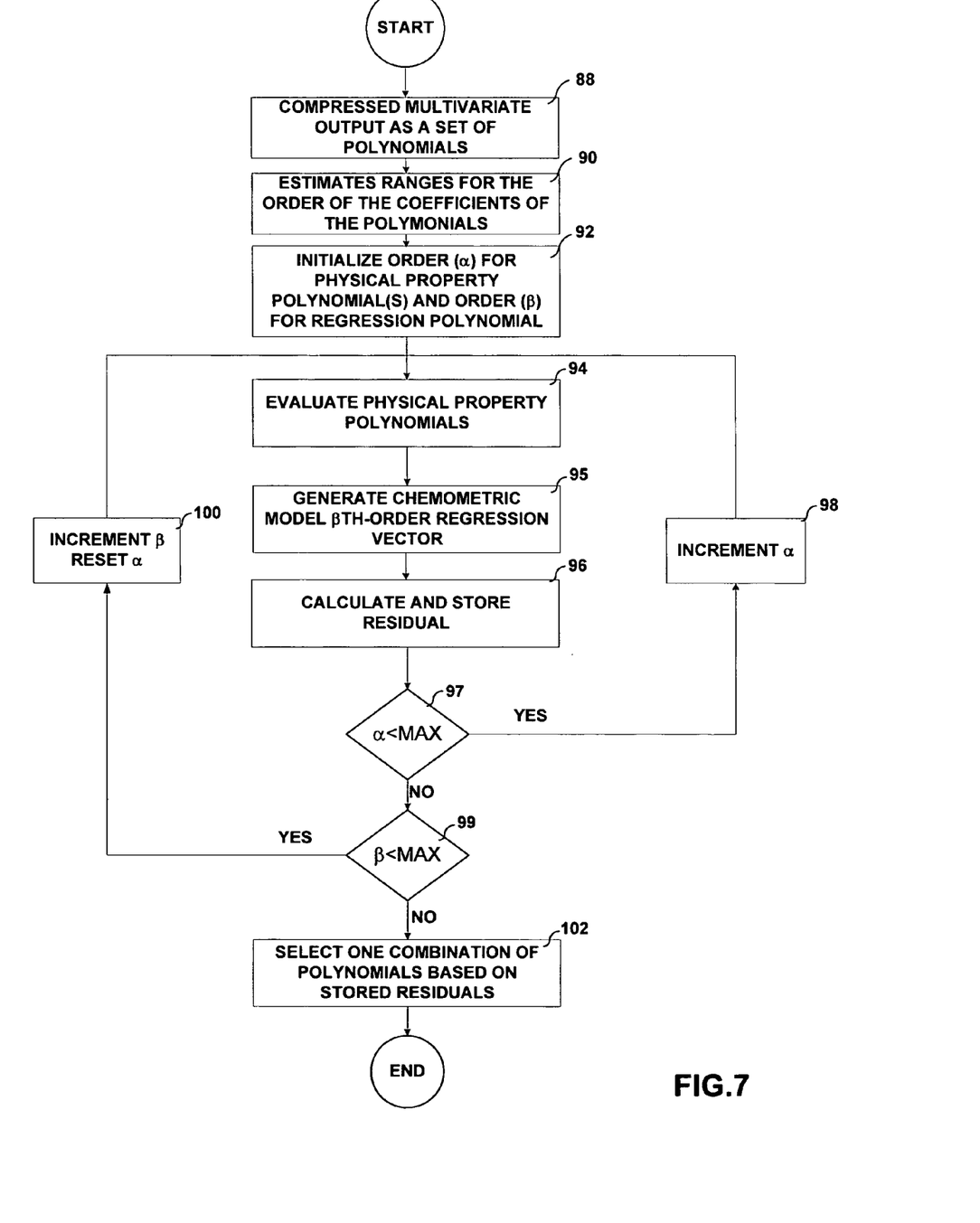
FIG. 7 is a flowchart illustrating an example of the development of the reverse chemometric model in further detail.

FIG. 7 is a flowchart illustrating the development of a particular reverse chemometric model in further detail. In particular, iterating through the illustrated example process may develop the regression model from which multivariate output data can be predicted using hypothetical performance properties.

Initially, research lab 8 estimates a range for the order of the coefficients of a polynomial representing the multivariate output data (88) as well as a regression polynomial (90). For PSD data, for example, a range for the order of the multivariate output polynomial of 8 to 15 and a range for the order of the regression polynomial of 2 to 4 may be appropriate. Next, research lab 8 initializes an order $\alpha$ of the multivariate output polynomial and an order $\beta$ for the regression polynomial. In particular, research lab initializes the orders of the polynomials to the minimums of the determined ranges (92).

After initializing the orders of the polynomials, research lab 8 evaluates the predicted multivariate output data as polynomials of order $\alpha$, each with coefficients of $\alpha+1$ (94). Research lab 8 then generates a chemometric model, such as a PLS model, with a regression vector of order $\beta$ and a maximum number of latent variables possible (95).

Next, research lab 8 calculates a root-mean square residual between the predicted multivariate output data reconstructed from the $\alpha^{th}$-order multivariate output data polynomial, the $\beta^{th}$ order regression polynomial and the original multivariate output data from the samples (96). Research lab 8 stores the calculated residual for later reference.

After calculating the residual for the current combination of multivariate output polynomial and regression polynomial, research lab 8 determines whether the order of the multivariate output polynomial has reached the maximum of the identified range (97). If not, research lab 8 increments the order (98) and repeats the generation of the model and the residual calculation (94, 95, 96).

If $\alpha$ has reached the maximum order for the range, research lab determines whether $\beta$ has reached the maximum of its corresponding identified range (99). If not, research lab 8 increments $\beta$, resets $\alpha$ to the minimum order for the multivariate output polynomial (100), and repeats the generation of the model and the residual calculation (94, 95, 96). Once all of the possible combinations for physical property polynomials and the regression polynomials have been generated and evaluated, research lab 8 selects one of the combinations based on the stored residuals (102).

To further illustrate the process, consider the use of a modified PLS approach to developing the reverse model.

Unlike conventional approaches, the approach calculates "scores" and "loadings" for both the performance data (referred to as the x-block) and the physical properties to be predicted (referred to as the y-block). In one embodiment, the PLS method incorporates an iterative least-squares fitting procedure to map the variance in the x-block to correlating changes in the y-block. In this case, a latent variable, i.e., a regression factor, may be calculated for each performance property included in the y-block. The following equations describe how each latent variable may be calculated starting with the first latent variable, which operates on the entire data set, whereas the remaining latent variables are determined from the calculated residuals.

First, research lab 8 calculates a weighting vector $w_1$ using one column of the y-block as an estimate of y-scores corresponding the first latent variable $u_1$ as follows:

$$w_i = \frac{X^T u_i}{\|X^T u_i\|}$$

This projection of the of the x-block data onto the pseudo y-scores can be used to generate a corresponding estimate of an x-block scores vector ($t_1$) for the latent variable as follows:

$$t_i = X w_i$$

Next, the x-block scores vector $t_1$ can be used to generate the loadings vector ($q_1$) for the projections of the y scores onto the x-block as follows:

$$q_i = \frac{u^T t_i}{\|u^T t_i\|}$$

Refined y-block scores can be generated by projecting the y-block onto loadings for the first latent variable as follows:

$$u_i = Y q_i$$

Corresponding x-block loadings ($p_i$) can then be calculated as follows:

$$P_i = \frac{X^T t_i}{\|t^T t_i\|}$$

The x-block loadings can be normalized for scaling purposes as follows:

$$P_{iNew_i} = \frac{P_i}{\|P_i\|}$$

Similarly, the weighting vector and the x-block scores can be normalized to a common scale:

$$t_{i_{NEW}} = t_i \|P_i\|$$

$$w_{i_{NEW}} = w_i \|P_i\|$$

Finally, a regression vector B for the first latent variable is calculated by fitting the X-block scores to the Y-block scores via a polynomial function, e.g. $p(t_i) = u_i$.

This operation is the vector equivalent of finding the solution, or "slope" b of the line, of a linear relationship between a independent variable x and a dependent variable y in a conventional least squares regression:

$$y = bx$$

Specifically, in this example, research lab 8 uses a polynomial relationship to describe the regression between the performance properties for product 7 (the x-block) and the multivariate output data (the y-block), such as the PSD data, that has been converted to polynomial coefficients. More specifically, research lab 8 first constructs a Vandermonde matrix for the x-block:

$$V_i = [x^n x^{n-1} \ldots x^1 x^0]$$

Since x is a vector of length m in this case, the matrix V will be of size m by n+1. Accordingly, the regression vector $b_i$ can formed by:

$$b_i = V_i \backslash y_i$$

in which the back-slash character, \, denotes "matrix division" or multiplication by the pseudo-inverse of the Vandermonde matrix V. The regression vector $b_i$ contains the n+1 polynomial coefficients that characterize the relationship between the x-block scores and the y-block scores for the first latent variable. Next, residuals $E_i$ and $F_i$ in the x-block and the y-block X are calculated as follows:

$$E_i = X - t_i p^T$$

$$F_i = Y - b_i t_i q_i^T$$

These residuals can be used as a starting point in calculating the regression vectors for the remaining latent variables. In this case, a latent variable (i.e. a regression factor) may be calculated for each performance property measurement that is included in the y-block.

Having built a regression model for predicting the compressed form of the multivariate output, research lab 8 de-compresses the predicted form. For example, if the compressed form is a set of polynomial coefficients, then these coefficients are evaluated as a polynomial of the appropriate order to generate the function or profile of the multivariate output. Research lab 8 then uses the statistical constraints applied to the multivariate output to the de-compressed predicted form in order to generate a multivariate output profile that can be used for predicting the necessary operating parameters according to the forward model developed by the steps in FIG. 5. This is done by applying the inverse of the statistical constraints in reverse order to the predicted form. For example, first divide the predicted form by the determined multiple of the operating parameter prediction regression vector, then multiply this by the standard deviation of the multivariate output data set, then add this to the mean of the multivariate output data set.

Figure 8:
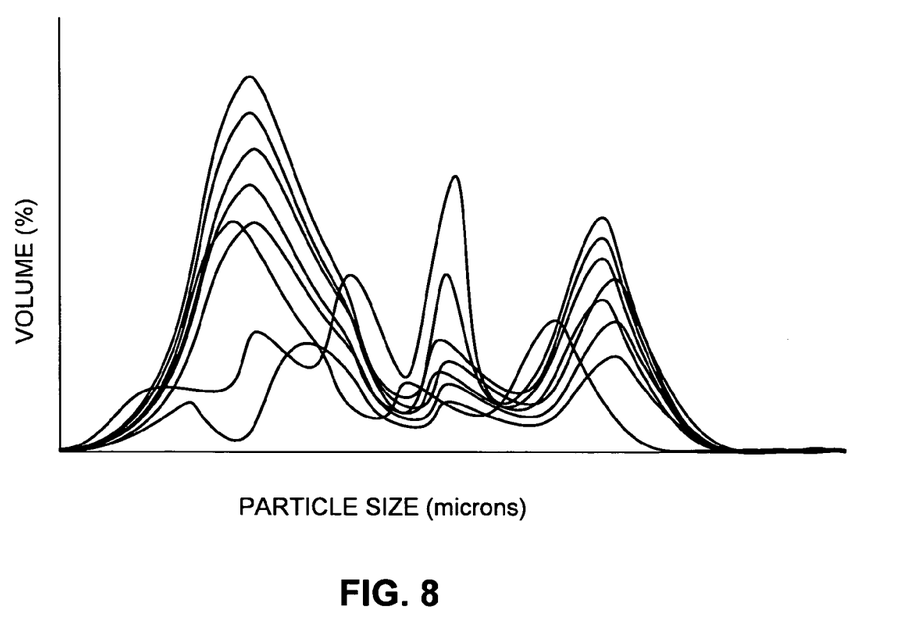
FIG. 8 is an example of a multivariate output graph illustrating distributions of measured particle sizes.

FIG. 8 is a graph illustrating example distributions of measured particle used by facilities 6 when manufacturing product 7. In particular, FIG. 8 graphically illustrates a number of curves representing particle size distributions of a network polymer (starch) under various cooking conditions. By making use of the reverse model, correlations between manufacturing operating parameters and the multivariate output can be controlled and exploited.

Figure 9:
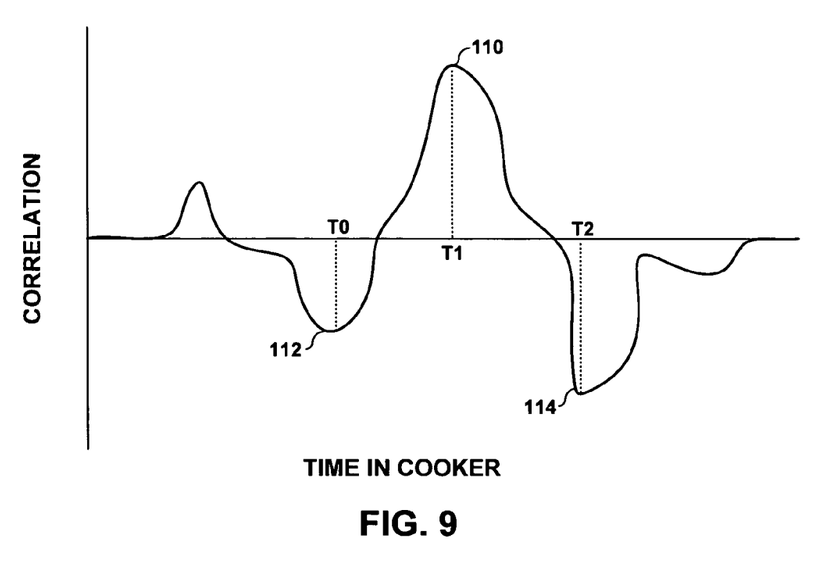
FIG. 9 is a graph illustrating an example correlation between a manufacturing operating parameter and a particle size distribution for a network polymer (starch).

FIG. 9 is a graph illustrating an example correlation between a manufacturing operating parameter and a particle size distribution for a network polymer (starch). These types of relationships may readily be determined empirically, allowing manufacturing facilities 6 to achieve almost any desired multivariate output profile by controlling the manufacturing process. Accordingly, by controlling the manufacturing process and by making use of the modeling techniques described above, manufacturing systems 6 can produce product 7 having specific physical properties.

In particular, FIG. 9 is a graph illustrating an example relationship between a cooking time and a particle size distribution for a starch network polymer product. Peak 110 indicates, for example, a strong positive correlation between cooking time T with particle size, while peaks 112, 114 indicate strong negative correlations. Such relationships and others may readily be determined empirically, allowing manufacturing facilities to make use of chemometric model 30 (FIG. 2).

Figure 10:
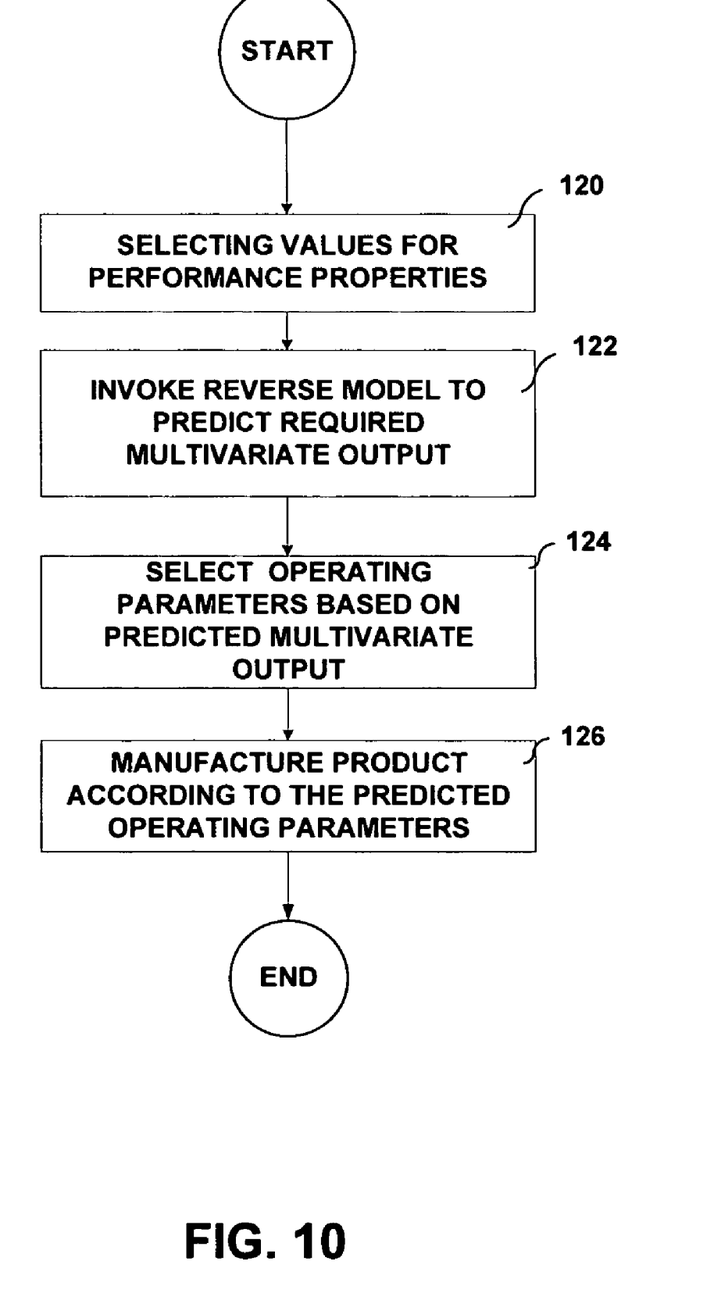
FIG. 10 is a flowchart providing an overview of operation of the system when controlling the manufacture of product.

FIG. 10 is a flowchart providing an overview of operation of system 2. In particular, business units 4 interact with product control center 12 to select desired performance properties for product 7 produced by manufacturing facilities 6 (120). Business units 4 may select performance properties based on pricing, customer preference information received from customer input center 14, current inventory, or other similar business information. Business units 4 may, for example, interact with product control center 12 to direct manufacturing facilities 6 to produce products within various ranges of performance, thereby lending to a tiered pricing scheme.

Based on the selected performance properties, product control center 12 invokes the reverse chemometric model described above to predict the required multivariate output that is necessary to achieve the desired performance properties for product 7 (122).

Next, product control center 12 determines the necessary operating parameters to achieve the predicted multivariate output (124). These parameters may be determined based on empirical data as described above. Finally, product control center 12 directs manufacturing facilities 6 to produce product 7 according to the operating parameters (126). In this manner, system 2 may exploit the inherent relationship between operating parameters and a multivariate output to finely tune products to achieve enhanced or different performance properties.

Figure 11:
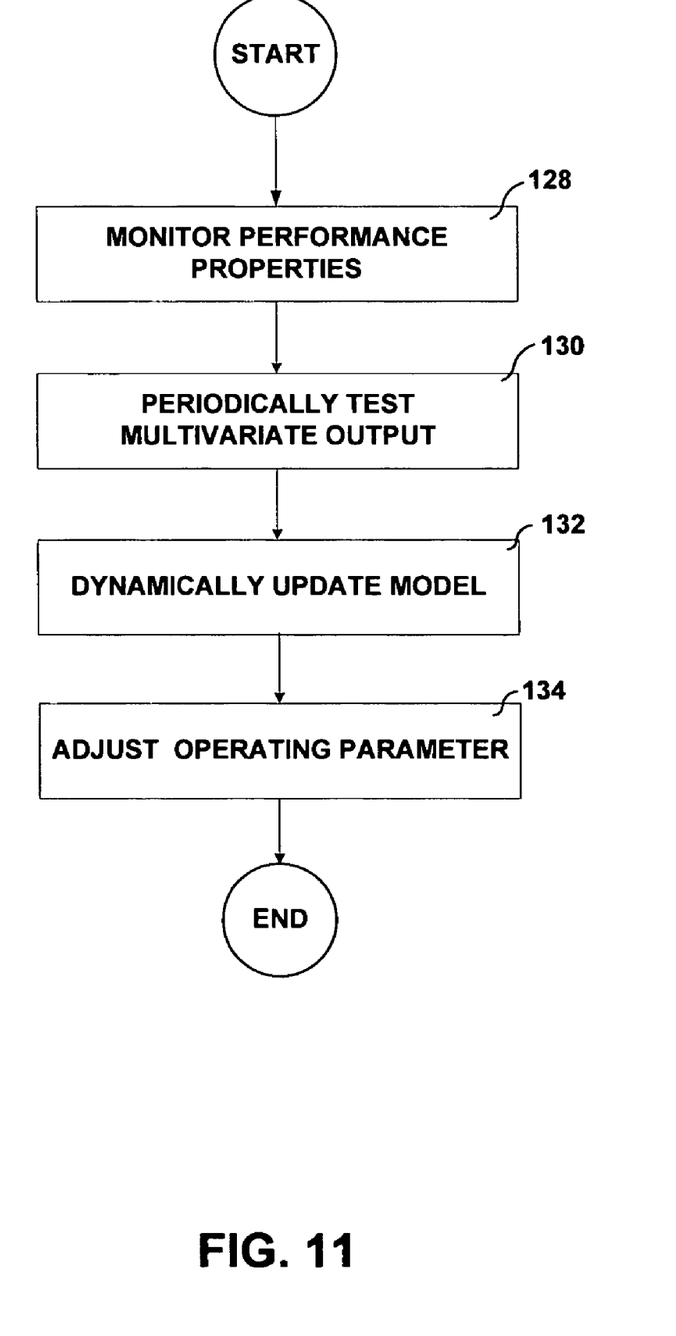
FIG. 11 is a flowchart illustrating an overview of operation of the system when implementing a reverse model to provide production of product.

FIG. 11 is a flowchart illustrating system 2 implementing a reverse model to provide accurate production of product 7. In particular, manufacturing facilities 6 engage test and measurement equipment to continually produce the multivariate output used during manufacturing (128). Manufacturing facilities 6, product control center 12 or research lab 8 may store the measurements for future use.

Next, equipment within manufacturing facilities 6 randomly performs performance test on samples of product 7 as produced by manufacturing facilities 6 (130). Modeling equipment operating in research lab 8, product control center 12 or even manufacturing facilities 6 dynamically generates the reverse model as described based on the newly measured multivariate output and performance properties (132). Finally, based on the new model, manufacturing facilities may select new operating parameters in order to achieve the updated multivariate output profiles (134).

Various embodiments of the invention have been described. These and other embodiments are within the scope of the following claims.

The invention claimed is:

1. A method comprising:
    developing a reverse chemometric model by:
        (a) developing a first regression model to calibrate a multivariate output with a preselected performance property of a product;
        (b) developing a second regression model to calibrate the multivariate output with at least one operating parameter that affects a value of the preselected performance property; and
        (c) developing a third regression model to predict a version of the multivariate output from the preselected performance property;
    receiving a communication from a business unit via a computer network, wherein the communication specifies a value for the performance property of the product;
    invoking the reverse chemometric model to calculate a multivariate output and an operating parameter based on the specified value to achieve the performance property; and
    communicating the operating parameter to a remote facility for manufacturing the product according to the operating parameter.

2. The method of claim 1, wherein developing a third regression model comprises developing a third regression model to predict a compressed, statistically constrained version of the multivariate output from the preselected performance property.

3. The method of claim 1, wherein invoking the reverse chemometric model comprises:
    convolving the predicted multivariate output with a predetermined template of the multivariate output to create a de-compressed vector; and
    using the de-compressed vector of the predicted multivariate output to predict the at least one operating parameter to yield the preselected performance property.

4. The method of claim 1, wherein invoking a reverse chemometric model comprises:
    calculating the predicted multivariate output using the third regression model;
    applying the second regression model to the predicted multivariate output to calculate the operating parameter; and
    using the operating parameter to produce the desired value of the preselected performance property.

5. The method of claim 4, wherein selecting the desired value of the preselected performance property comprises selecting the desired value based on data selected from a group consisting of pricing for the product, sales volumes of the product, a geographic location of a facility for manufacturing the product, customer preference information for the product, and a current level of inventory of the product.

6. The method of claim 4, wherein calculating the predicted multivariate output comprises developing a reverse model in which multivariate output data serves as a predicted variable, and the preselected performance property for the product serves as a prediction variable.

7. The method of claim 4, wherein calculating the predicted multivariate output comprises developing a computation model from which the multivariate output can be predicted based on the performance properties of the manufactured product.

8. The method of claim 4, wherein calculating the predicted
    multivariate output comprises:
    producing the product;
    analyzing the product to generate multivariate output data for the product;
    conducting performance tests on the product to generate performance property data for the preselected performance property; and applying chemometric techniques to develop a correlation between the multivariate output and the performance property data.

9. The method of claim 8, wherein applying chemometric techniques comprises:
representing the multivariate output data as a polynomial; and
regressing the multivariate output polynomial against the performance property data.

10. The method of claim 9, wherein regressing coefficients of the polynomial comprises using a Partial Least Squares regression algorithm.

11. The method of claim 9, wherein applying chemometric techniques comprises:
estimating a range for an order for the multivariate output polynomial;
estimating a range for an order for a regression polynomial;
iterating over the estimated ranges to generate combinations of multivariate output
polynomials and regression polynomials;
calculating residuals for the combinations; and
selecting one of the combinations based on the residuals.

12. The method of claim 1, wherein the predicted multivariate output is selected from the group consisting of particle size distributions, rheology profiles, texture profiles, gas chromatography outputs, liquid chromatography outputs, thermal analysis outputs, infra red spectroscopy outputs, Raman spectroscopy outputs, and optical absorption spectroscopy outputs.

13. The method of claim 1, wherein the at least one operating parameter is selected from the group consisting of a reaction time, a reaction temperature, an addition rate for the reactants, a concentration of the reactants, and mixing intensity of a reaction.

14. The method of claim 1, wherein the product is selected from a group consisting of monomers, ionomers, oligomers, polymers, inorganic particles, and network polymers including polysaccharides.

15. The method of claim 1, wherein the product comprises a paper product, and the preselected performance property of the paper product is selected from the group consisting of surface strength, internal bond, burst strength, tensile strength, tear strength, porosity, short span compression (SCT), dynamic contact angle, and starch retention.

16. A method comprising:
determining a set of price levels for a product, wherein the price levels correspond to values of a performance property of the product;
calculating multivariate output profiles and operating parameters to achieve the values of the performance property;
constructing a reverse chemometric model from the multivariate output profiles;
receiving a communication from a business unit via a computer network, wherein the communication specifies a value for the performance property of the product;
invoking the reverse chemometric model to calculate a multivariate output based on the specified value and an operating parameter to achieve the specified value for the performance property; and
communicating the operating parameter to a remote facility for manufacturing the product according to the operating parameter.

17. The method of claim 16, wherein the reverse chemometric model calculates a multivariate output by calculating a particle size distribution (PSD) for the product.

18. The method of claim 16, further including selling the product according to the respective price levels.

19. A system comprising:
one or more computers interconnected by a network;
a first software module executing on at least one of the computers to calculate multivariate output profiles and operating parameters to achieve values of a performance property of a product, wherein the values for the performance property correspond to price levels for the product;
a second software module executing on at least one of the computers to construct a reverse chemometric model from the multivariate output profiles;
a third software module executing on at least one of the computers to present an interface to receive a selection of the performance property of the product, wherein the third software module applies the reverse chemometric model to predict a multivariate output from the selected performance property of the product; and
a fourth software module executing on at least one of the computers to communicate the operating parameter to a remote facility for manufacturing the product according to the operating parameter.

20. The system of claim 19, wherein the third software module comprises a web server and the interface comprises a user interface to receive the selection of the performance property of the product.

21. The system of claim 20, further comprising a client computer located within a manufacturing facility and coupled to the web server via a network, wherein the web server selects an operating parameter based on the predicted multivariate output and communicates the operating parameter to the client computer for manufacturing the product according to the operating parameter.

22. The system of claim 21, wherein the operating parameter is selected from the group consisting of a reaction time, a reaction temperature, an addition rate for the reactants, a concentration of the reactants, and mixing intensity for the reaction.

23. The system of claim 19, wherein the third software module comprises an application programming interface (API) to programmatically receive the selection of the performance property.

24. The system of claim 19, wherein the product comprises a paper product, and the preselected property of the paper product is selected from the group consisting of surface strength, internal bond, burst strength, tensile strength, tear strength, porosity, short span compression (SCT), dynamic contact angle, and starch retention.

25. The system of claim 19, wherein the interface provides input areas for a user to provide one selected from a group consisting of pricing for the product sales volumes of the product, a geographic location of a facility for manufacturing the product, customer preference information for the product, and a current level of inventory of the product.

26. A computer-readable medium comprising instructions therein to cause a computing device to:
calculate multivariate output profiles and operating parameters to achieve values of a performance property of a product, wherein values of the performance property of the product correspond to price levels for the product;

construct a reverse chemometric model from the multivariate output profiles;

select a value for the performance property of the product;

apply the reverse chemometric model to calculate a multivariate output based on the selected value;

select an operating parameter based on the calculated multivariate output; and communicate the operating parameter to a facility for manufacturing the product according to the selected operating parameter.

27. The computer-readable medium of claim 26, further comprising instruction causing the computing device to develop the reverse chemometric model as a model in which multivariate output data serves as a predicted variable, and the performance property for the product serves as a prediction variable.

28. The computer-readable medium of claim 26, further comprising instruction causing the computing device to develop a computation model from which the multivariate output can be predicted based on the performance properties of the product.

29. The computer-readable medium of claim 26, further comprising instruction causing the computing device to apply chemometric techniques to develop a correlation between the multivariate output data and the performance property data.

30. The computer-readable medium of claim 26, further comprising instruction causing the computing device to:

receive input defining a range for an order for a the multivariate output polynomial;

receive input defining a range for an order for a regression polynomial;

iterate over the ranges to generate combinations of multivariate output polynomials and regression polynomials;

calculate residuals for the combinations; and select one of the combinations based on the residuals.

31. A method comprising:

developing the reverse chemometric model by:

a. developing a first regression model to calibrate a multivariate output with a performance property of a product;

b. developing a second regression model to calibrate the multivariate output with at least one operating parameter that affects the value of the performance property; and c. developing a third regression model to predict a compressed, statistically constrained version of the multivariate output from the performance property and convolving the predicted multivariate output with a predetermined template of the multivariate output to create a de-compressed vector of the predicted multivariate output that is used to predict the at least one operating parameter to yield the performance property wherein invoking a reverse chemometric model comprises:

d. calculating the predicted multivariate output using the third regression model and the template; and e. applying the second regression model of step (b) to the predicted multivariate output of step (d), to calculate the at least one operating parameter;

receiving a communication from a business unit via a computer network, wherein the communication specifies a value for the performance property of the product;

invoking the reverse chemometric model to calculate a multivariate output based on the specified value and an operating parameter to achieve the performance property; and communicating the operating parameter to a remote facility for manufacturing the product according to the operating parameter.

* * * * *